United States Patent [19]

Neiman

[11] Patent Number: 4,883,165
[45] Date of Patent: Nov. 28, 1989

[54] HANGER FOR PAINT CONVEYOR LINE

[75] Inventor: Richard D. Neiman, Chester Springs, Pa.

[73] Assignee: Vesper Corporation, Bala-Cynwyd, Pa.

[21] Appl. No.: 221,958

[22] Filed: Jul. 8, 1988

[51] Int. Cl.⁴ .............................................. B65G 17/32
[52] U.S. Cl. .................................. 198/682; 104/172.4; 198/465.4
[58] Field of Search ...................... 198/680, 682, 465.4; 104/172.4, 89

[56] References Cited

U.S. PATENT DOCUMENTS

| | | | |
|---|---|---|---|
| 2,265,248 | 12/1941 | Pomeroy | 198/682 |
| 2,411,906 | 12/1946 | Suman | 198/687 |
| 2,517,652 | 8/1950 | Gaboury | 198/682 |
| 3,231,067 | 1/1966 | Gaboury et al. | 198/682 |
| 3,257,963 | 6/1966 | King | 104/172.4 X |
| 3,268,062 | 8/1966 | Gladstone | 198/682 |
| 3,282,400 | 11/1966 | Jonson | 198/680 X |
| 3,777,872 | 12/1973 | Rikman et al. | 198/465.4 |
| 4,122,778 | 10/1978 | DiRosa | 198/678 |
| 4,180,152 | 12/1979 | Sefcik | 198/680 X |

Primary Examiner—Frank E. Weiner
Assistant Examiner—Cheryl L. Gastineau
Attorney, Agent, or Firm—Eugene Chovanes

[57] ABSTRACT

A hanger for an endless, continuously traveling conveyor for carrying articles on wire hooks through a spray paint field. The hanger has an upper element permanently attached to the traveling conveyor and a lower element easily removed and replaced while the conveyor is traveling, so that the holes in the lower element for the wire hanger hooks can be easily cleaned of encrusted paint.

2 Claims, 2 Drawing Sheets

HANGER FOR PAINT CONVEYOR LINE

This invention pertains to traveling conveyors in the form of endless moving lines wherein articles to be painted are suspended by hangers from the lines, which can be, for instance, chain links. More specifically, the invention pertains to hangers secured to the traveling conveyors from which the articles are suspended.

BACKGROUND OF THE INVENTION

Endless, continuously moving conveyors in the form of loops which can be, for instance, 2000' in length, are used in painting of products such as, for instance, metal panels. The conveyor lines in the form of endless loops may have inclines and declines and include vertical and horizontal travel.

A typical conveyor speed could be, for instance, 20' per minute.

The conveyors are essentially chain conveyors which have suspended at close intervals, for instance, at 1' centers, hangers. These hangers are generally vertically depending links which are bolted or otherwise securely fastened to the conveyor chains.

The links have holes therein which are intended to receive removable wire hanger hooks passed through the holes at the hanger hook's upper end. The article to be painted, for instance a panel, is hooked onto the lower end of the wire hanger hooks. The hanger hooks can be of, for instance, wire of a 3/16" diameter.

The entire conveyor including loop, the hanger links, hooks and articles are subject to an electrical charge of the type used in the electrostatic process of painting wherein atomized spray paint is attracted to the charged metal. In this process, the paint is not only attracted to the metal product to be painted, but also to the hooks and hanger links since they too are electrically charged.

There is a frequent paint build up on the hanger links and the holes get blocked with paint, so that the wire hanger hook can no longer be inserted. There must be a continuous effort to clean the hanger link holes by drilling, chipping and the like. Generally, the work is done on a hanger link weekly by one man and possibly two who, for instance, work on the hangers while they are moving to remove the paint from the holes and the hanger link itself.

In other instances, the hanger links, because of difficulty in paint removal, must be removed from the conveyor and worked on separately from the conveyor at a fixed station.

The process described above results in the continuous problem of removing paint build up under difficult conditions, since the conveyor is moving constantly in an endless fashion. To shut the conveyor down would cause substantial economic loss.

SUMMARY OF THE PRESENT INVENTION

The present invention is intended to provide a structure wherein a paint-encrusted hanger link element can be readily removed and replaced with a clean element while the conveyor is traveling.

The hanger comprises two pieces wherein one portion of the hanger is intended to remain permanently on the conveyor and the other portion of the hanger is intended to be readily removed and replaced.

The removable portion of the hanger has a series of holes extending horizontally, through which the hooks are inserted. In the present invention, the removable portion of the hanger is easily removed, cleaned and replaced.

It is intended that there will be a continuous replacement or substitution of clean hanger elements for paint built-up hanger elements. The built-up hangers will be stripped by chemical, abrasive or mechanical stripping methods.

DETAILED DESCRIPTION OF THE INVENTION

Figure 1:
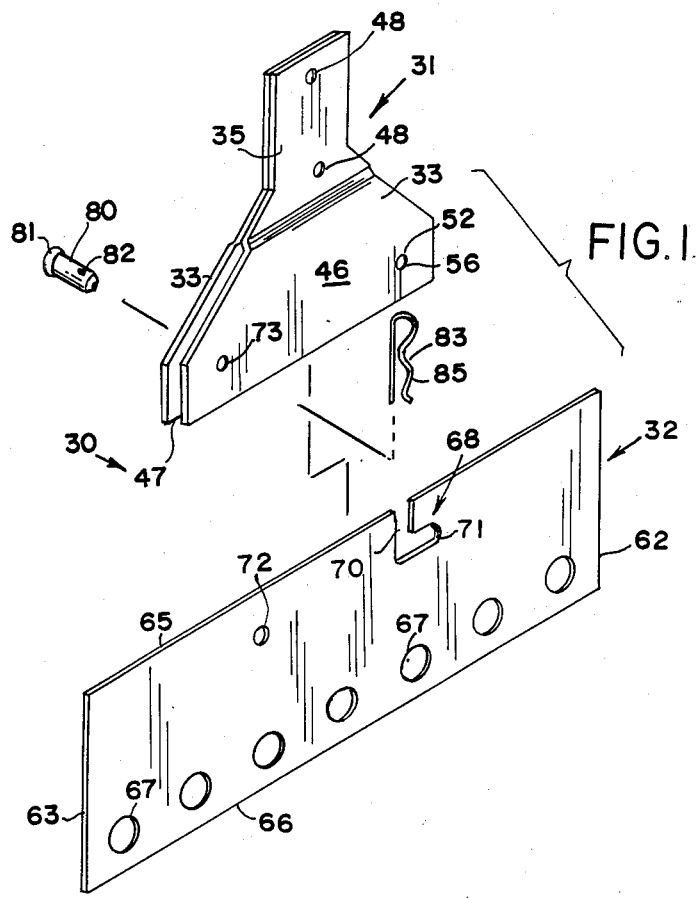
FIG. 1 is an exploded perspective view of the hanger elements.

A chain link conveyor 20 having endless chain 21 is suspended from a fixed track 22 by means of rollers 23 and suspension arms 25. The chain 21 is secured to arm 25 at 26.

The hanger of the invention is connected to the chain and arm at 29. Products to be painted such as metal panels 50 and 51 are suspended from hangers 30 by wire hooks 60 and 61. Hooks 60 suspend from the hanger 30 and, in this instance, additional articles 51 are suspended by hooks 61 from panel 50.

As in the prior art, a traveling flexible member such as a conveyor chain or cable 21 continuously travels on track 22, carrying with it hangers 30 on which hooks 60 carry articles 50 and hooks 61 carry articles 51 through an atomizing spray paint field. An electrical charge, either positive or negative depending on the system used, is imparted to hanger 30 either from the metal chain through electrical connections, or otherwise by an electrical contact system. The charge is carried from hanger 30 through metallic hooks 60, through article 50, through hooks 61 to article 51. Paint is not only attracted to articles 50 and 51, but also to hanger 30. Suitably painted articles 50 and 51 are continuously removed at a point in the travel of the continuously moving endless conveyor by removing hooks 60 from hanger 30.

The general description set forth so far is in accordance with prior art structure and practice.

The invention is concerned with hangers 30 as best seen in FIG. 1, hanger 30 essentially comprising an upper element 31 and a lower element 32. Hanger element 31 is composed of two identical plates 33 which are suitably secured at their upper section 35 as by spot welding or riveting.

Figure 4:
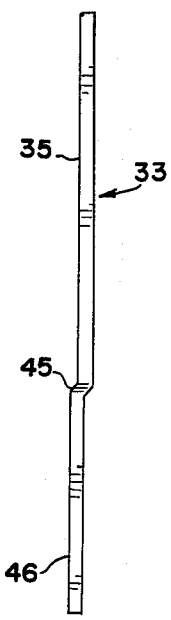
FIG. 4 is a right side elevational view of the element of FIG. 3.
Figure 5:
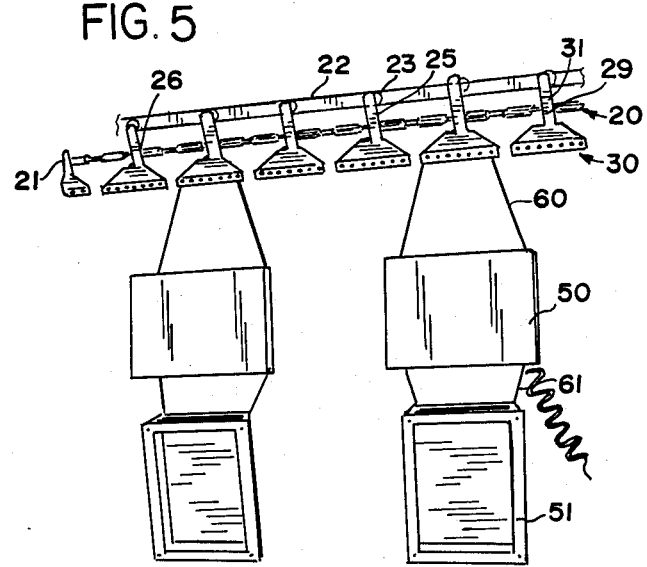
FIG. 5 is a perspective view of a conveyor showing the invention in use on the conveyor.

As seen in FIG. 4, upper section 35 is rectangular in form, having a top 36 and sides 37. A downwardly, outwardly extending shoulder 38 depends from sides 37 and terminates in vertically extending downward sides 40. Upper element 31 has a flat bottom 42. Shoulder portion 43 between sides 38 has an offset 45 whereby lower section 46 is offset from upper section 35. When identical plates 33 are joined as by spot welding as seen in FIG. 1, a deep channel 47 is formed in upper element 31 between lower sections 46.

Holes 48 are formed in section 35 to receive bolts which secure upper element 31 to chain 21 and arm 25 in a fixed manner.

Figure 2:
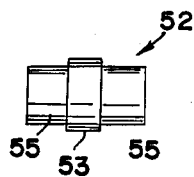
FIG. 2 is a perspective view of a plug used in the hanger assembly.
Figure 3:
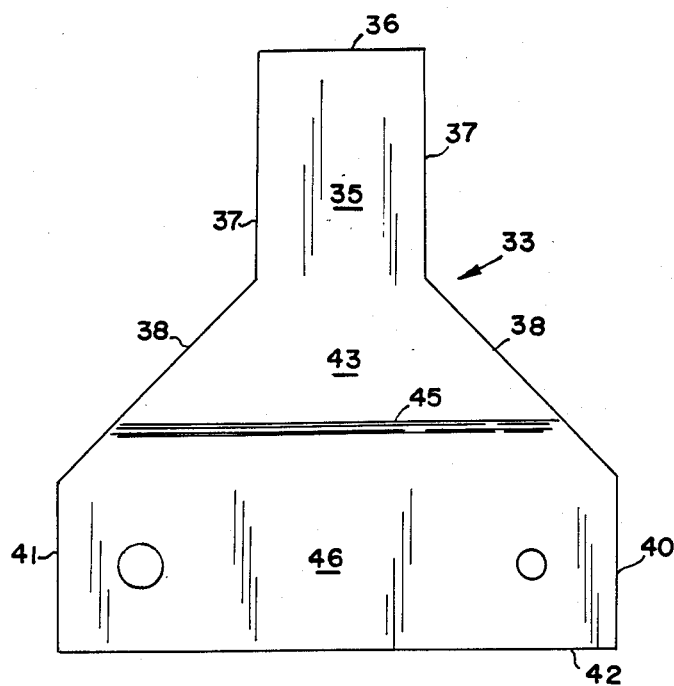
FIG. 3 is a front elevational view of one of the elements making up the fixed portion of the hanger.

Before assembling plates 33 together as by spot welding, a plug 52 as seen in FIG. 2, having a shoulder portion 53 circular in cross section, and integral end portions 55 circular in cross section and conforming to the diameter of hole 56 in plates 33, is inserted between the plates so that when plates 33 are welded or otherwise secured together, plug 52 forms a permanent element in the assembly.

Lower element 32 of the hanger is in the form of a horizontally extending plate having vertically extending sides 62 and 63, a top 65 and bottom 66. Element 32 extends horizontally and has a series of holes 67, for instance seven in number, equally spaced, extending along the bottom area of the plate. At the top of element 32, there is an angled slot 68 having a vertical slot 70 connected to horizontal slot 71 formed within plate 32. Slot 68 in width conforms to the diameter of shoulder portion 53 of plug 52. A hole 72 is also formed in the element 32 at a distance from the righthand end, as viewed in FIG. 1 of slot 71 which conforms to the distance of hole 73 through plates 33 from plug 52 in the upper hanger portion.

The diameter of holes 72 and 73 are the same as is the diameter of shoulder portion 53 of plug 52. The rightmost portion of horizontal slot 71 as viewed in FIG. 1 is of arcuate shape and of the same diameter as the diameter of shoulder portion 53 on plug 52.

Lower element 32 is assembled into upper element 31 by sliding slot 70 through plug 52 fixed in holes 56 in upper element 31. With the plug bottoms in the vertical portion 70 of slot 68, the anchor is slid to the left as viewed in FIG. 1 until the righthand end of horizontal slot portion 71 of slot 68 which is arcuate in shape sets against shoulder portion 53 of plug 52. In this position, hole 72 will then align with hole 73 upon rotation to the proper position. A clevis pin 80 having a head 81 and hole 82 is passed through holes 73 in upper element 31 and hole 72 in lower element 32 to firmly secure plate 32 vertically and horizontally in upper hanger portion 31. A hair pin cotter 83 is passed through hole 82 so that a grooved portion 85 on the hair pin cotter snaps against the side of clevis pin 80 to hold the hair pin cotter 83 in position, restraining clevis pin 80 against withdrawal.

Elements 31 and 32 are now securely locked together. This operation can be readily performed while the conveyor is traveling since the plate 32 can be readily engaged at slot portion 68 with a minimum of alignment since the channel 47 in element 31 guides plate 32 in a vertical direction and the plate 32 can readily be slid horizontally with respect to upper portion 33. One side 65 of plate 32 is engaged with stop 52. The operator can feel when slot 70 is reached and the remainder of the relative upward movement of plate 32 can occur. The operator then slides the plate 32 horizontally until it fits into end of slot 71. Lower plate 32 is rotated while clevis pin 80 is held in position in a hole 73 in plate 33 until holes 72 and 73 align. The clevis pin 80 can then be forced completely into hole 73 on the opposing plate 33 in element 32 until head 81 seats. Hair pin cotter 83 is then engaged into clevis pin 80 through hole 82.

The opposite procedure is followed to disengage plate 32 from plate 33.

By means of the present invention, the upper element 31 of hanger 30 remains bolted to arm 25 on chain 21 in the traveling endless conveyor. Lower element 32 is removably secured in upper element 31 having holes 67. Hanger hooks 60 are hooked into holes 67 and articles suspended and painted. The articles are then removed, removing hooks 60. When holes 67 become encrusted with paint, the operator simply removes paint-encrusted lower element 32 and replaces it with a cleaned plate 32. The plates are removed and replaced, while the conveyor is in operation, with a minimum of effort. Paint-encrusted plate 32 is then suitably cleaned either by immersion in a paint solvent or by a chipping hammer or by, for instance, abrasion means.

An important feature of the hanger 31 is that channel 47 is protected from paint encrustation, as is the section of plate 32 that fits within the channel. This permits ready removal and replacement of lower elements 32 from and into upper elements 31.

I claim:

1. In an endless traveling conveyor for carrying articles to be painted through a spray paint field having
    (1) a fixed track;
    (2) roller arms on the track;
    (3) a traveling flexible member secured to the roller arms; and
    (4) hangers secured to and depending from the roller arms having holes therein for suspending the articles;
the improvement comprising
a hanger having
    (1) an upper element
        (a) secured at its upper section to roller arms, and having
        (b) a lower section having a channel extending therein and having a uniform width;
    (2) a lower element in the form of a rectangular plate, extending in a vertical plane, having horizontally spaced holes therein;
    the thickness of the plate conforming generally to the thickness of the channel, and
    (3) means for removably securing the lower element partially within the channel of the upper element, comprising
        (a) a fixed plug in the upper element that receives a slot in the lower element to form an initial pivotal connection between the elements, and
        (b) matching holes in the upper and lower elements for receiving a removable pin after the pivotal connection is made and the lower element is rotated to line up the holes;
wherein the holes in the lower element are located outside the upper element when the lower element is secured in the upper element.

2. A hanger of claim 1 wherein the slot has a vertical portion and a horizontal portion at right angles to one another.

* * * * *